H. W. Collender.
Billiard Table Cushion.
No. 2,512.
Reissued Mar. 19. 1867.
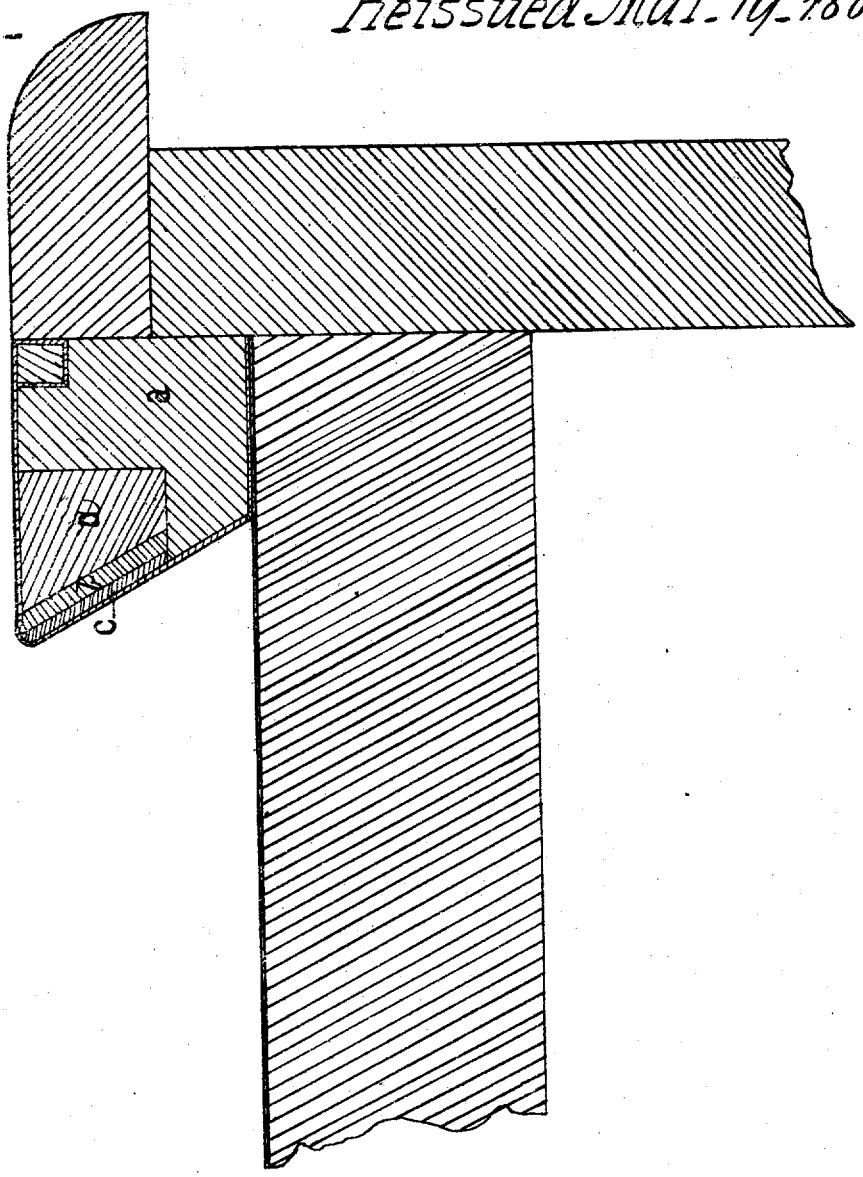
WITNESSES.
H. A. McKarney
Wm. H. Brickow
INVENTOR.
H. W. Collender

UNITED STATES PATENT OFFICE.

HUGH W. COLLENDER AND MICHAEL PHELAN, OF NEW YORK, N. Y., ASSIGNEES OF HUGH W. COLLENDER.

IMPROVEMENT IN CUSHIONS FOR BILLIARD-TABLES.

Specification forming part of Letters Patent No. 30,177, dated September 25, 1860; reissue No. 2,512, dated March 19, 1867.

*To all whom it may concern:*

Be it known that HUGH W. COLLENDER, of the city, county, and State of New York, invented a certain new and useful Improvement in Combination Cushions for Billiard-Tables; and we do hereby declare that the following is a full, clear, and exact description thereof, reference being had to the accompanying drawings making part of this specification, and which represent a cross-vertical section of the said improved cushion as applied to a billiard-table.

Cushions for billiard-tables have heretofore been made with the back of what is known as the soft compound of vulcanized india-rubber or allied gum, and with a facing of the same gum or gums, also vulcanized, but rendered harder either by mixing fibrous or equivalent substances with the gum while in the green or plastic state, and then vulcanizing it, or by mixing with the gum a larger proportion of sulphur to make what is known as the hard compound of vulcanized india-rubber, or an approximation thereto, and whether made in the one or the other of the above modes, the facing of the more dense substance has been united with the more elastic back while the two compounds are in the green or plastic state, and then, so united, submitted to the process of vulcanization. The object of so composing cushions was to overcome a known defect in cushions made wholly of the soft compound of vulcanized india-rubber. The soft compound, from its great elasticity, makes the ball rebound with great activity, but as this substance is very compressible it follows that the ball, in striking, buries a considerable portion of its circumference into the cushion, and, although the ball rebounds accurately after striking the cushion at right angles with its face, such is not the result when the ball approaches the cushion diagonally. The great difference between the angle of reflection and the angle of incidence which was observed in the use of such cushions led to the invention and introduction of what is known as "Phelan's Combination Cushions," which has contributed so much to the practical accuracy of billiard-tables for playing the carom game. The two modes of construction above indicated, which are improvements of Michael Phelan's combination cushion, avoid the defects of the single cushion made of the soft compound of vulcanized india-rubber, for they present a face for the ball to strike against which yields to the blow with a steel-like spring—viz., by bending instead of permitting the ball to bury a considerable portion of its circumference in the cushion—and, as the back is made of the soft compound, it gives great activity to the rebound, for at every blow a much greater length of cushion is brought into action by the bending of the hard face than if the whole cushion was made with the soft compound. We have found, however, that, notwithstanding all the good qualities of cushions so constructed, they are still objectionable because of the disagreeable banging sound produced when struck by the ball, and because of the rapid wearing away of the cloth along the upper edge, which wearing is due to the hard facing which extends up and forms the upper edge of the cushion immediately under the cloth.

The desideratum was to avoid the defects and retain all the advantages of the above modes of construction; and to this end my said invention consists in forming billiard-table cushions of three thicknesses of vulcanized india-rubber or allied gum, the back or body of the soft compound, then a layer or thickness of the harder compound prepared according to either of the modes above described, or by any equivalent preparation, and a thin facing of the soft compound, all united in the green or plastic state and then vulcanized.

We take a block or strip, *a*, of the usual soft compound of vulcanizable gum to form the elastic and compressible back. We then prepare a strip, *b*, of much less thickness, either by increasing the proportional quantity of sulphur to make what is known as the hard compound, or an approximation thereto, or by mixing fibrous or equivalent substances with the soft compound, and while in the green or plastic state we cause the two to adhere; and we then apply to the outer face of the layer *b* a thin strip, *c*, of the soft compound and cause that also to adhere while in the green or plastic state, and then vulcanize the whole and apply it to the table in the usual manner of applying india-rubber springs, or in any other suitable manner.

Cushions so constructed will be found superior to all other known kinds, for the face immediately next to the cloth being of the soft compound will not produce the disagreeable sound or "bang" experienced in the use of cushions with a comparatively hard face; and as this facing is thin, and the comparatively-hard layer or thickness is immediately behind, the ball in striking will not be buried in the cushion, as it would be if the whole cushion was made of the soft compound, but in yielding to the blow it will bend along a considerable portion of its length, as in the case of the usual combination cushion, and as this is backed with the soft compound forming the body of the cushion it will have all the activity of reaction due to the best-known construction of combination cushion. In this way we are enabled to retain all the advantages known to be possessed by the combination cushion, while we avoid the defects above pointed out.

What we claim as the invention of the said HUGH W. COLLENDER, and desire to secure by Letters Patent, is—

Making cushions for billiard-tables of two thicknesses of what is known as the soft compound of vulcanized india-rubber or allied gum, with an interposed thickness of what is known as the hard compound of vulcanized india-rubber or allied gum, or, as the equivalent thereof, with an interposed thickness of the soft compound of vulcanized india-rubber or allied gum rendered hard by the admixture of fibrous or equivalent substance, substantially as and for the purpose specified.

HUGH W. COLLENDER.
MICHL. PHELAN.

Witnesses:
WM. H. BISHOP,
A. DELACY.